United States Patent [19]

Gale et al.

[11] 4,155,627

[45] May 22, 1979

[54] COLOR DIFFRACTIVE SUBTRACTIVE FILTER MASTER RECORDING COMPRISING A PLURALITY OF SUPERPOSED TWO-LEVEL RELIEF PATTERNS ON THE SURFACE OF A SUBSTRATE

[75] Inventors: Michael T. Gale, Gattikon; Hans W. Lehmann, Hedingen; Roland W. Widmer, Rümlang, all of Switzerland

[73] Assignee: RCA Corporation, New York, N.Y.

[21] Appl. No.: 862,835

[22] Filed: Dec. 21, 1977

Related U.S. Application Data

[63] Continuation of Ser. No. 705,931, Jul. 16, 1976, abandoned.

[30] Foreign Application Priority Data

Feb. 2, 1976 [GB] United Kingdom ................. 4013/76

[51] Int. Cl.$^2$ ......................... G02B 5/18; G02B 27/38
[52] U.S. Cl. ........................... 350/162 R; 350/162 SF; 427/43
[58] Field of Search ............. 350/162 SF, 162 R, 314, 350/317, 3.82; 96/36.2; 427/43

[56] References Cited

U.S. PATENT DOCUMENTS

| | | | |
|---|---|---|---|
| 2,769,111 | 10/1956 | Sadowsky ............................ | 350/317 |
| 3,771,857 | 11/1973 | Thomasson et al. ................. | 350/317 |
| 3,883,232 | 5/1975 | Tsunoda ............................ | 350/162 SF |
| 3,911,479 | 10/1975 | Sakurai ............................ | 350/162 SF |
| 3,957,354 | 5/1976 | Knop ............................... | 350/162 SF |
| 3,981,568 | 9/1976 | Bartolomei ........................ | 350/317 |

*Primary Examiner*—Ronald J. Stern
*Attorney, Agent, or Firm*—Samuel Cohen; George J. Seligsohn

[57] ABSTRACT

Superposed fine-detail multi-level patterns (e.g., superposed diffraction gratings having specified line spacing dimensions less than 10 micrometers and specified depth dimensions less than 5 micrometers) can be fabricated by linearly adding (e.g., by evaporation) an additional two-level pattern to an existent multi-level pattern or, alternatively, by linearly subtracting (e.g., by sputter or plasma etching) an additional two-level pattern to an existent multi-level pattern.

4 Claims, 4 Drawing Figures

COLOR DIFFRACTIVE SUBTRACTIVE FILTER MASTER RECORDING COMPRISING A PLURALITY OF SUPERPOSED TWO-LEVEL RELIEF PATTERNS ON THE SURFACE OF A SUBSTRATE

This is a continuation of application Ser. No. 705,931 filed 7/16/76 now abandoned.

The present invention relates to a method for the fabrication of a plurality of superposed two-level relief patterns on the surface of a substrate and, in particular, such fabrication of fine-detail relief patterns.

Reference is made to U.S. Pat. No. 3,957,354, issued May 18, 1976 to Knop and assigned to the same assignee as the present invention, which is directed to a diffractive subtractive color filtering technique. As disclosed in U.S. Pat. No. 3,957,354, a diffractive structure comprising a rectangular relief profile embossed in the surface of a transparent medium, such as plastic, may operate as a subtractive color filter responsive to polychromatic (e.g., white) illuminating light for deriving zero diffraction order light of a predetermined subtractive primary color. More specifically, for any given medium having a known index of refraction, the color of the zero diffraction order of such a filter when illuminated with white light is determined by the amplitude (depth) of the rectangular relief profile. Thus, a first specified amplitude corresponds to cyan (a minus red filter), a second specified amplitude corresponds to yellow (a minus blue filter) and a third specified amplitude corresponds to magenta (a minus green filter). Other desired color hues can be obtained by superposing suitable proportions by area (screening) two or three diffractive structures having the aforesaid first, second or third specified amplitudes. White is manifested by the absence of any diffractive structure and black by the superposition of all three diffractive structures.

A straight-forward way of physically preparing subtractive color filters manifesting color pictures, which is described in U.S. Pat. No. 3,957,354, is the use of a color-separation negative mask, corresponding to a predetermined subtractive primary color component of a given color scene, taken together with a square-wave grating mask to produce a relief pattern in a positive photoresist layer corresponding to the predetermined primary color. For example, a thin glass substrate similar to a microscope slide, may be coated with a layer of positive photoresist having a predetermined thickness. This predetermined thickness is calculated to have a value such that, after exposure to light and development thereof to remove all the photoresist from the glass substrate from solely those areas that have been exposed to light, the depth of the developed unexposed photoresist has a value which just corresponds to the specified amplitude of the predetermined subtractive primary color. Preferably, this exposure is made by contact printing the color-separation negative through a chrome-on-glass diffraction grating. In this manner, three separate photoresist recordings may be prepared which, respectively, manifest each of the three subtractive primary color components of the color scene, with the diffraction grating in each of these recordings either having a different line spacing and/or having a different angular displacement (such as 45°, 60° or 120°) relative to each other with reference to the given color scene to prevent the generation of intermodulation components. By placing the three recordings in serial relation and in proper registration with each other, the subtractive color filter manifesting a color picture of the color scene is derived.

In practice, the photoresist recording is normally not used directly, but is used as a master recording for making a metal stamper for embossing a replica of the relief pattern in the surface of a transparent medium, such as a sheet of plastic. The subtractive color filter is then derived by a properly-registered sandwich of three plastic replicas, each respectively manifesting a different one of the three subtractive primary color components of the given scene.

The manufacture of such diffractive subtractive color filters in embossed plastic could be simplified if it were possible to simultaneously impress at least two and preferably all three primary color diffractive structures on the same one face of a plastic sheet. This means that the one face of the plastic sheet has a single two-level pattern impressed therein, of a depth equal to any respective one of the first, second and third specified amplitudes, in only those regions thereof corresponding to a single subtractive primary color, where only a single diffractive structure is present. However, in those regions thereof corresponding to a mixture of two subtractive primary colors, where two superimposed diffractive structures are present, a multi-level pattern exists including two respective depths equal to each of the respective specified amplitudes of the two superimposed diffractive structures as well as one depth equal to the sum of these specified amplitudes. Further, in those regions of the impressed phase plate of the plastic in which all three superposed diffractive structures are present, there exists a multi-level relief pattern including three respective depths equal to each of the first, second and third specified amplitudes, three respective depths equal to the respective sums of any two of these three specified amplitudes, and one depth equal to the sum of all three of these specified amplitudes. Further, it is essential that any error in the value of these respective depths be no greater than a few percent, since the color characteristics of the diffractive subtractive filter are determined by the absolute value of these depths. However, a non-linear relationship exists between the developed depth of a photoresist and the total amount of exposure it has experienced. Therefore, the developed depth of a region thereof in which a plurality of diffractive structures are superposed turns out to be substantially greater than the sum of their individual specified amplitudes.

One solution to this problem is disclosed in U.S. Pat. No. 4,082,453, issued Apr. 4, 1978 to Knop and assigned to the same assignee as the present invention. In accordance with this solution, the layer of photoresist on a substrate forming a master recording has a predetermined thickness which is selected so that, after development, unexposed regions thereof will be just equal in thickness to the sum of the specified amplitudes of two superposed two-level diffractive structures. Employing this technique, it is possible to accurately mix any two of the primary colors in a single embossed surface diffractive subtractive filter because the number of adjustable parameters in the positive photoresist layer of a master recording therefor is exactly three (the predetermined thickness of the photoresist layer, the first exposure time and the second exposure time), which is just sufficient for superposing two gratings. However, this method cannot be expanded to three superposed grating structures, required for mixing all three primary colors on a single surface of a diffractive subtractive filter, because eight different levels (including zero) are required, but only four parameters are available (photoresist layer thickness and the three respective exposure times for each of the three primary colors). Thus, in accordance with the solution disclosed in the aforesaid U.S. Pat. No. 4,082,453, it is only possible to emboss two superposed gratings manifesting two of the three primary colors on one surface of a diffractive subtractive filter. A second master recording is required for embossing the remaining one of the three primary colors either on the opposite surface of the same sheet of a diffractive subtractive filter or, alternatively, on the surface of a separate contiguous serially-disposed sheet of the diffractive subtractive filter.

The present invention is directed to a more general solution for fabricating a plurality of superposed two-level relief patterns on the surface of a substrate, which makes it possible to fabricate a single master recording for all three superposed two-level diffractive structures for use in making embossed diffractive subtractive color filters. In particular, in accordance with the principles of the present invention, a plurality of superposed two-level relief patterns on the surface of the substrate is fabricated by substantially linearly superposing an additional two-level pattern on an existent multi-level pattern comprised of at least one two-level pattern. The fabrication method for accomplishing this comprises four successive steps. First, the multi-level pattern is coated with a layer of photoresist. Second, the photoresist is exposed with a binary pattern of light corresponding to the additional two-level pattern and then the photoresist is developed to reveal only a first set of portions of the existent multi-level pattern, which first set of portions underlie one of the levels of the additional two-level pattern, and leave a second set of portions of the existent multi-level pattern covered with a thickness of developed photoresist, which second set of portions underlie the other of the levels of the additional two-level pattern. Third, the surface of a substrate is altered by (1) simultaneously adding a thickness of material both to the revealed first set of portions and to the developed photoresist covering the second set of portions or by (2) subtracting a thickness of underlying material from the revealed first set of portions while simultaneously subtracting some but not all of the thickness of the developed photoresist covering the second set of portions. Fourth, all of the remaining developed photoresist is removed to now reveal the second set of portions.

This and other features and advantages of the present invention will become more apparent from the following detailed description taken together with the accompanying drawing, in which.

Figure 1:
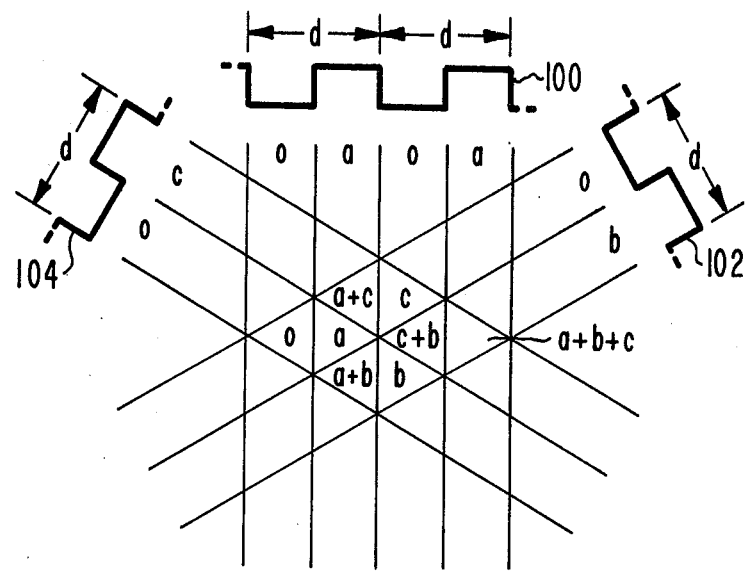
FIG. 1 is a plan view diagram of a multi-level relief pattern formed by the superposition of any combination of one or more angularly-displaced square-wave grating patterns, each respective one of which has a different depth.

Referring now to FIG. 1, there is diagrammatically shown, by way of example, the superposition of three square-wave diffraction gratings 100, 102 and 104. As shown, gratings 100, 102 and 104 are angularly displaced from each other by 60° and have the same line spacing dimension d. However, the respective depth dimensions of gratings 100, 102 and 104 are different from each other. Specifically, grating 100 has a depth dimension a, grating 102 has a depth dimension b and grating 104 has a depth dimension c. As indicated in FIG. 1, the superposition of the three two-level square-wave gratings 100, 102 and 104 results in an eight-level relief pattern consisting of level 0, level a, level b, level c, level a+b, level a+c, level b+c and level a+b+c. In general, the superposition of N two-level patterns results in a multi-level relief pattern having $2^N$ levels.

In accordance with the disclosure of the aforesaid U.S. Pat. No. 3,957,354, the subtractive primary color yellow may be obtained with an optical amplitude of 655 nanometers; the subtractive primary color magenta may be obtained with an optical amplitude of 785 nanometers, and the subtractive primary color cyan may be obtained with an optical amplitude of 920 nanometers. Any optical amplitude in the vicinity of any of these subtractive primary colors still provides that one of the subtractive primary colors, although of a slightly different hue. It has now been found that the selection of 610 nm. for yellow, 780 nm. for magneta and 935 nm. for cyan more closely match the subtractive primary color hue standards that already have been developed for color-picture printing inks than the 655 nm., 785 nm. and 935 nm. values disclosed in the aforesaid U.S. Pat. No. 3,957,354.

In any event, the physical depth of a subtractive primary color diffractive structure embossed in a transparent medium, such as a plastic sheet, is equal to the optical amplitude of that subtractive primary color divided by the difference in index of refraction between the transparent medium and its surroundings. A typical transparent medium, such as polyvinyl chloride, has an index of refraction of about 1.5 and is normally surrounded by air. Thus, in this case, the difference in index of refraction is about 0.5, so that the respective physical depth dimensions corresponding to the three subtractive primary colors are all smaller than two micrometers. Even with a transparent medium exhibiting an index of refraction as small as 1.2, surrounded by air, the maximum physical depth would be no greater than five micrometers.

The present invention, is capable of fabricating a plurality of superposed two-level fine-detail relief patterns having line spacing dimensions in the range of between 1 and 10 micrometers and depth dimensions in the range of between 0.1 and 5 micrometers. Although not limited thereto, such a plurality of superposed two-level fine detail patterns are particularly suitable for fabricating a master recording for embossing three superposed two-level diffractive structures, such as diffractive structures 100, 102 and 104, corresponding to the three subtractive primary colors, on the same single surface of a diffractive subtractive filter.

As is known in the art, unless the angular orientation and/or line spacing dimension of three superposed gratings are different from each other, spurious intermodulation spatial frequencies are generated. Therefore, while in the preferred embodiment shown in FIG. 1, the line spacing dimension d is the same and the angular orientation among gratings 100, 102 and 104 are different from each other, it should be understood that, if respective line spacing dimensions of gratings 100, 102 and 104 were different from each other, the angular orientation among the three gratings could be the same or could still be different from each other.

Figure 2:
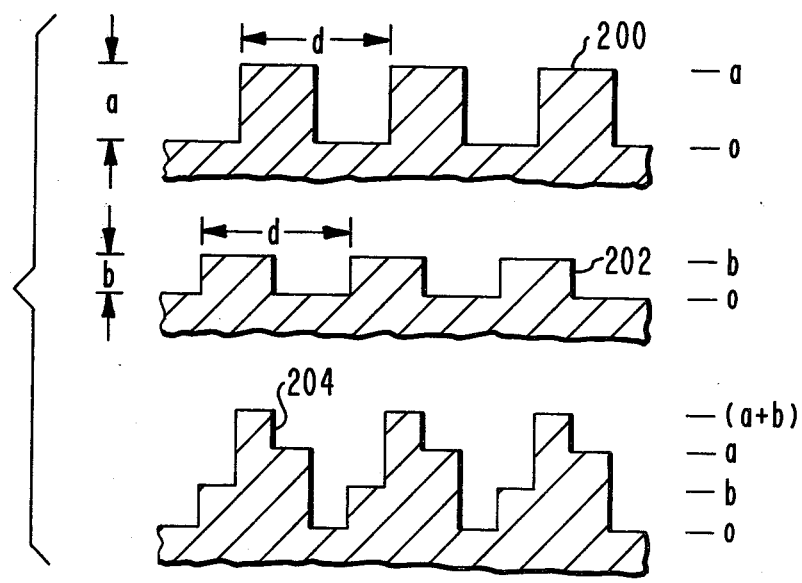
FIG. 2 is a side-view diagram showing respective profiles of each of two relatively displaced square-wave grating patterns of different depths and a composite pattern showing the superposition thereof.

Referring now to FIG. 2, it can be seen that profile 200 of grating 100 alone consists of a two-level relief pattern, having levels 0 and a respectively, and having a line spacing dimension d. Similarly, profile 202 of grating 102 alone consists of a two-level relief pattern, having levels 0 and b respectively, and also having a line dimension d. For clarity, the gratings 100 and 102 with profiles 200 and 202 are shown in FIG. 2 as being parallel but of different phase, instead of angularly displaced with respect to each other as shown in FIG. 1. This effects only the areas and shapes, but not the number and depths, of the levels resulting from superposition. Therefore, in FIG. 2, the superposition of only the two gratings 100 and 102 results in the four-level relief pattern shown in profile 204, composed of level 0, b, a and (a+b) respectively. Although not shown in FIG. 2, it will be seen that the profile for grating 104 alone will consist of a two-level relief pattern, having levels 0 and c respectively. Further, the profile for grating 104 will have the same line spacing dimension d as profiles 200 and 202, but will be phase displaced with respect to both profiles 200 and 202. In addition, a four-level relief pattern, having a profile similar to profile 204, will result from the superposition of either the two gratings 100 and 104 or the two gratings 102 and 104. By the same reasoning, the superposition of all three gratings 100, 102 and 104 results in an eight-level relief pattern, having levels 0, a, b, c, (a+b), (a+c), (b+c) and (a+b+c). In principle, the present invention is not limited to the superposition of only three two-level patterns. Any plural number N of two-level patterns may be superposed to provide a multi-level relief pattern having $2^N$ different levels.

A multi-level relief pattern made up of the superposition of a plurality of two-level relief patterns can be fabricated by appropriately altering the surface of a substrate. Such alteration of the surface can be accomplished either by the addition of material to the original ground of the substrate surface or, alternatively, by the subtraction of material from the original ground of the substrate surface. In accordance with a first species of the present invention, shown in FIG. 3, alteration of the substrate surface is accomplished by addition of material of the substrate surface and in accordance with a second species of the present invention, shown in FIG. 4, alteration of a substrate surface is accomplished by subtraction of material from the substrate surface.

Figure 3:
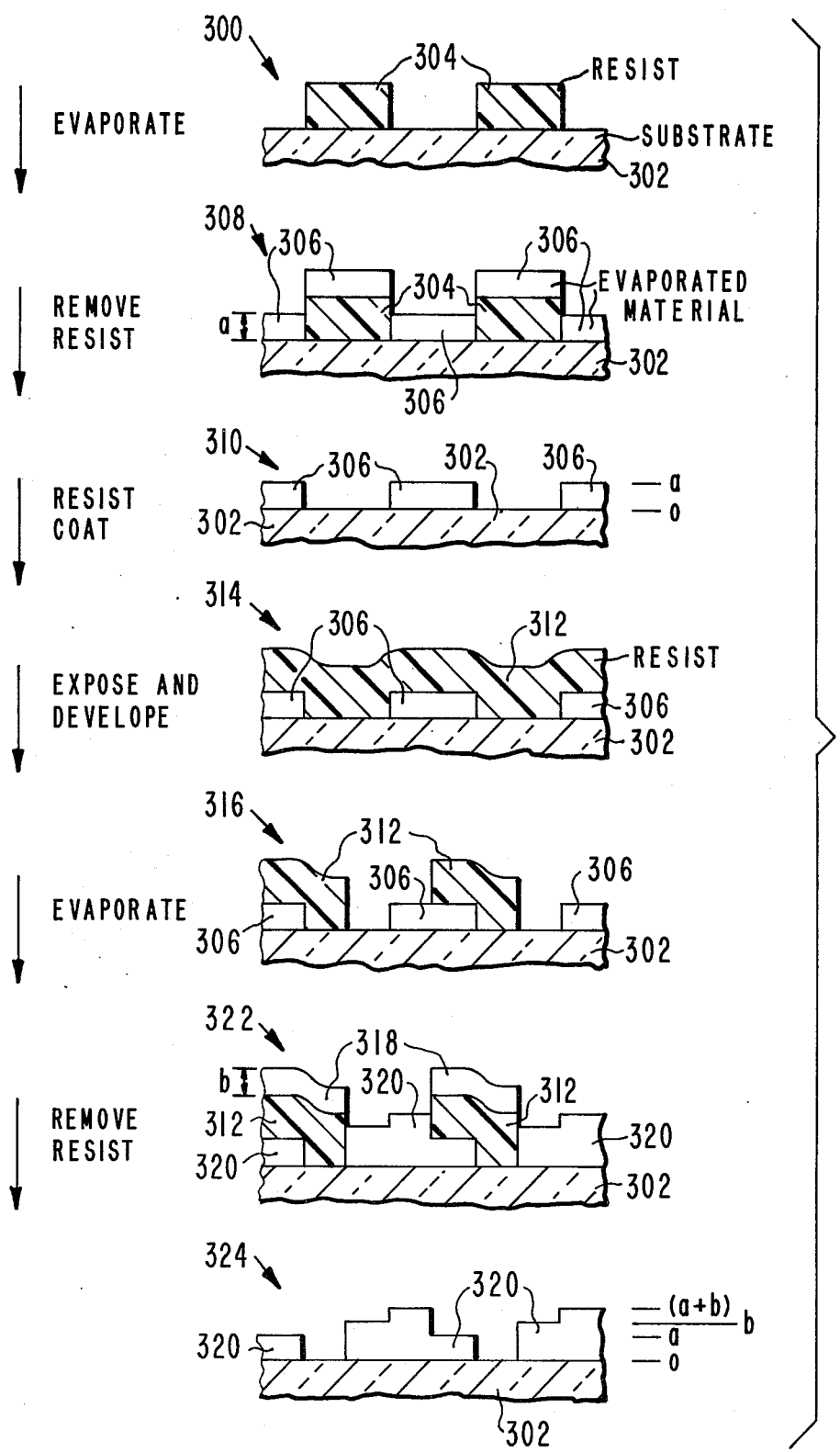
FIG. 3 illustrates the fabrication of fine-detail multi-level relief patterns by the linear superposition of two-level patterns by evaporation.

Referring now to FIG. 3, profile 300 shows a substrate 302, composed of a material, such as Corning 7059 glass or quartz, which is not affected by the presence, development or removal of a photoresist layer thereon. As shown in profile 300, initially disposed on a surface of substrate 302 is an already existent two-level grating relief pattern in the form of photoresist stripes 304. Photoresist stripes 304 may be achieved, in a manner known in the art, by coating (e.g., spin-coating) the surface of substrate 302 with a layer of positive photoresist (such as Shipley AZ 1350) of a thickness which is at least 1.5 times a specified depth dimension, such as depth dimension a. The layer of photoresist is exposed to light passed through transparent portions of a suitable grating mask (e.g., a chrome-on-glass mask) in contact therewith, and the photoresist is then developed to remove all the photoresist from those regions thereof which have been exposed to light. A sharp rectangular profile for the resist pattern is important, and this is readily achieved by conventional contact printing techniques using a positive photoresist such as Shipley AZ 1350. By evaporating a layer of suitable material 306, such as silicon monoxide, onto the surface of substrate 302 to the specified thickness a, corresponding to the height of the first two-level pattern, profile 308 is obtained. The requirement for the evaporation of an individual two-level pattern is described by Smith et al in their article "A High-Yield Photolithographic Technique for Surface Wave Devices," *J. Electrochem. Soc.* 118 821 (1971). It is important that the evaporated atoms or molecules arrive at the substrate at near normal incidence, which requires a small area of evaporation source and a large source to substrate distance. An ideal apparatus is an electron beam evaporator with a source to substrate distance greater than about 50 cm. However, good results have also been obtained using a standard thermal evaporation source (diameter about 9 mm) and a 18 cm source to substrate distance. Other suitable materials for evaporation include metals, such as gold, aluminum and copper, although the internal stresses in evaporated film of these metals make them less suitable than silicon monoxide for films greater than about 1 micrometer thick. Also it is generally necessary to first evaporate a thin layer of chromium, about 20 nm, thick, to promote adhesion of these metals to the substrate. The evaporated layer thickness can be monitored and accurately controlled using a conventional quartz crystal oscillator monitor.

Provided the photoresist profile is sharp and the evaporated material is incident normal to the substrate, there is little deposition of material on the resist sidewalls. Therefore, the photoresist 304, together with all material evaporated onto it, can be removed by immersion in a suitable solvent (e.g., acetone for Shipley AZ 1350 photoresist) to provide the first required two-level relief pattern with levels 0 and a as shown in profile 310. Specifically, the photoresist is attacked by the solvent through the sidewalls and removed together with all material evaporated onto it.

In order to obtain the linear superposition of an additional second two-level pattern, substrate 302 is recoated with another layer of photoresist 312, shown in profile 314. The thickness of photoresist layer 312 is selected to be at least 1.5 times the specified depth b. Because of the first evaporation pattern, the surface of the photoresist layer 312 will not be flat, as shown in profile 314, but will show ripples related to the underlying substrate relief, somewhat smoothed by surface tension effects. However, this is of no consequence because the photoresist is again everywhere greater than about 1.5 times the following evaporation thickness b.

Photoresist layer 312 is exposed to light through a suitable grating mask (e.g., chrome-on-glass mask) and then developed, in a manner similar to that described above in connection with the derivation of photoresist stripe 304 in profile 300. Diffraction effects of this second contact printing step becomes progressively more serious as the evaporated substrate relief increases, which tends to reduce the developed photoresist profile sharpness relative to the desired second two-level pattern. This problem is minimized by using a highly nonlinear resist development characteristic, having a gamma much greater than unity, which is that provided by Shipley AZ 1350 photoresist used with Shipley AZ 1350 developer. In this manner, sharp profiles may be obtained when the depth dimension approaches the line spacing dimension. For instance, sharp profiles have been obtained over depths in excess of 2.5 micrometers with gratings of line spacing periods in the range of 3 to 5 micrometers. For clarity, this second grating is again shown in FIG. 3 as being parallel but shifted in phase with respect to the first evaporated grating 310, whereas in practice it would normally be angularly displaced with respect to the first evaporated pattern grating. Thus, after exposure and development, profile 316 is obtained.

In a manner similar to that described above in connection with profile 308, the evaporation step is repeated to linearly add a layer of an evaporated material 318, which is partly superposed on evaporated material 306 to form multi-level patterns 320, as shown in profile 322. Then, in a manner similar to that described in connection with profile 310, developed photoresist layer 312 is dissolved together with all material evaporated onto it to provide the four-level profile 324. As shown in profile 324, respective depths of the four-level pattern 320 are 0, a, b and (a+b). Further, by repeating in order each of the steps discussed in connection with profile 314, 316, 322 and 324 the third specified depth c can be added. The addition of third specified depth c results in an eight-level relief pattern on the surface of substrate 302, in which the eight levels consist of 0, a, b, c, (a+b), (a+c), (b+c) and (a+b+c).

More specifically, in accordance with experiments which were actually performed, selected substrates such as (1) quartz and (2) Corning 7059 glass were spun coated with a 2 micrometer thick film of Shipley AZ 1350 positive photoresist and dried by baking for 30 minutes at a temperature of 80° C. The photoresist was exposed with a grating pattern of a 5 micrometer period line spacing by contact printing through a chrome-on-glass mask with ultraviolet light from a 500 watt mercury lamp. Typical exposure times were 2-5 minutes. The photoresist was then developed for 15 to 30 seconds using Shipley AZ 1350 developer at 1:1 dilution in water, giving a square profile relief grating in the photoresist.

A film of silicon monoxide, of thickness about 1.7 micrometers, was then evaporated onto the substrate using a thermal evaporation source of a diameter about 9 mm. and a source to substrate distance of about 18 cm. The substrate was carefully oriented to be normal to the incident evaporated material and the film thickness was monitored using a quartz crystal oscillator gauge. After evaporation, the photoresist was dissolved away by immersing the substrate in acetone and using ultrasonic agitation. The substrate was then recoated with a nominal 2 micrometer film of photoresist and a second grating pattern was contact printed onto the photoresist with an orientation of 120° to the first pattern, and the photoresist was then developed as before. The second film of silicon monoxide of thickness about 1.4 micrometers, was then evaporated onto the substrate and the photoresist subsequently removed using acetone. The procedure was repeated for a third grating of a depth about 1.1 micrometers and orientation 120° with respect to each of the other two gratings.

Resulting structures were eight-level relief patterns similar to that shown in FIG. 1. An analysis of the grating profiles by scanning electron microscopy showed that the grating levels were optically smooth and the side of the grating lines were typically within 15° of the vertical. Analysis of the optical diffraction properties of the structure together with the electron microscope results confirm the linear superposition of three evaporated patterns to provide a satisfactory eight-level profile of the structure.

Further experiments were conducted using gold, aluminum and copper as the evaporated material. The structure profiles were found to be relatively good, but internal stresses in films of thickness greater than about 1.0 micrometer resulted in individual grating lines breaking away from the substrate. Adhesion was improved by evaporating a thin (about 20 nm.) layer of chromium prior to each main evaporation step.

Fabricated multi-level structures were hot embossed into thermoplastic films, such as polyvinyl chloride and polycarbonate both directly and via an intermediate metal master. The final structures were thus formed in transparent medium as required for applications in optics, such as a diffractive subtractive color filter for deriving a zero-order diffraction image of a color scene in response to being illuminated with white light.

A relief pattern formed of a superposition of a plurality of two-level patterns need not be fabricated by the addition of material to the surface of the substrate. It may also be fabricated by the subtraction of material from the substrate surface material. This subtraction of material from the surface of the substrate may be accomplished by certain etching processes, such as a sputter etching process or a plasma etching process.

Figure 4:
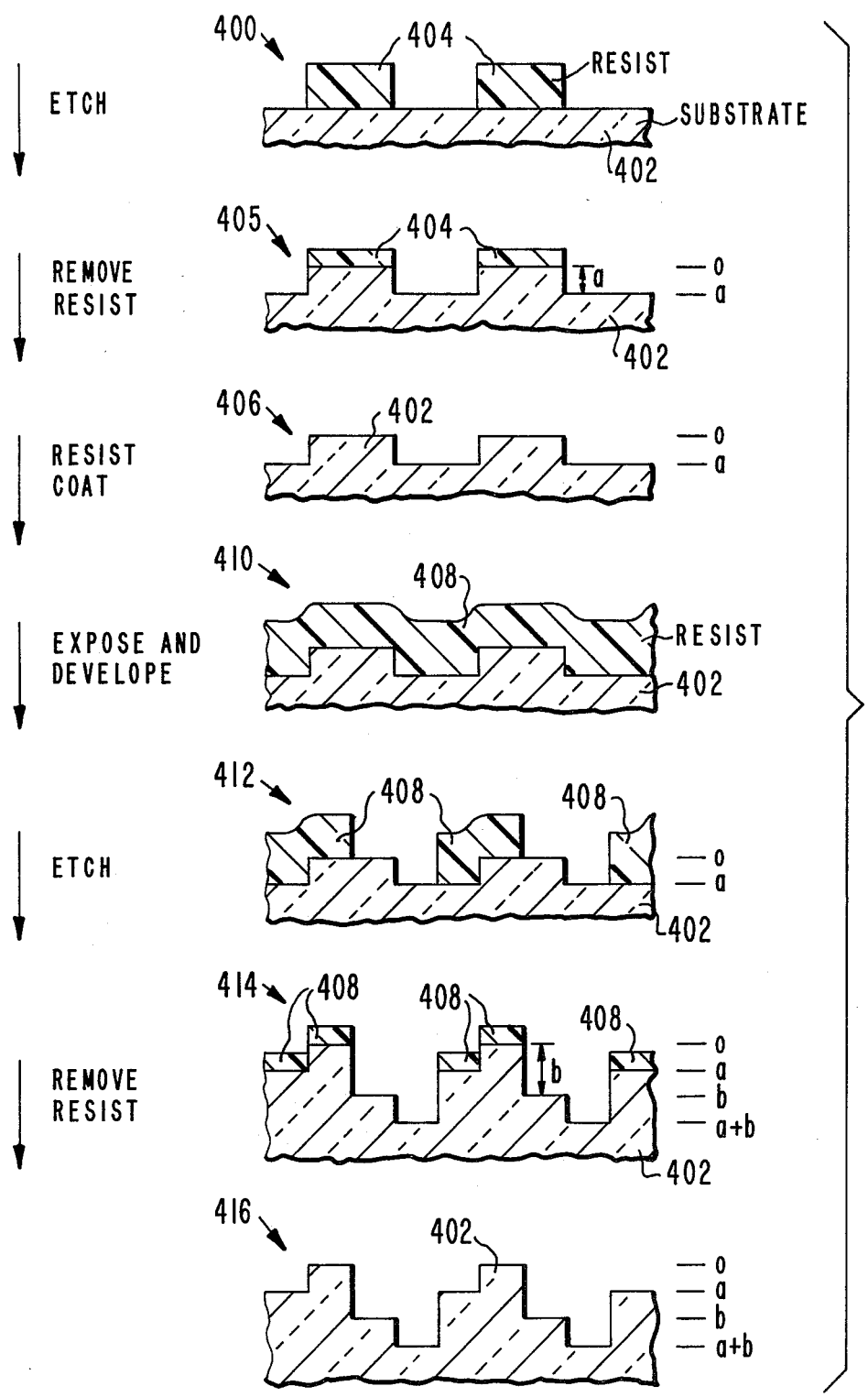
FIG. 4 shows the fabrication of fine-detail multi-level relief patterns by the linear superposition of two-level patterns by etching.

More particularly, referring to FIG. 4, profile 400, which comprises substrate 402 having photoresist stripes 404 on a surface thereof, is identical in all material respects with profile 300 of FIG. 3. Etching results in the removal of substrate material, which may be glass or quartz, from only the revealed portions of the surface of substrate 402 and, in certain cases, of photoresist material from the remaining portions of substrate 402 which are covered by photoresist stripes 404. The rate of etching depends on (1) the particular etching process (i.e., sputter etching or plasma etching and (2) the material being etched (i.e., substrate or photoresist). The initial thickness of photoresist stripes 404 is sufficiently great so that at least some thickness of photoresist stripes 404 remains when the revealed portion of the surface of the substrate 402 has been etched to the specified depth a, as shown in profile 402. In the case of sputter etching, the relative etching rate of photoresist stripes 404 can be reduced (and hence required initial thickness of photoresist stripes 404 can be made smaller) by baking the photoresist prior to etching, e.g., for about 30 minutes under vacuum or nitrogen on a hot plate at a temperature of between 80-100° C. This results in the sputter-etch rate of the photoresist and the substrate becoming roughly equal, in which case a minimum photoresist thickness of only about 1.2 times the required substrate etch depth, i.e., specified depth a, is adequate. As in the case for evaporation, described above, a sharp rectangular profile for the photoresist pattern, which is required, is readily achieved by conventional contact printing techniques using a positive photoresist such as Shipley AZ 1350. In any case, after the revealed portion of the surface of substrate 402 is etched to the specified depth a, etching is terminated and then the remaining portions of photoresist stripe 404 shown in profile 402 are removed to provide the first desired two-level relief pattern of specified depth a in substrate 402, as shown in profile 406.

In order to linearly superimpose an additional second two-level pattern, substrate 402 is coated with a thin layer of photoresist 408, as shown in profile 410, in a manner similar to that described above in connection with profile 314. Then, in a manner similar to that described in connection with profile 316, photoresist layer 408 is exposed and developed to provide profile 412.

A second etching, just sufficient to etch the revealed portions of substrate 402 by the specified depth b then takes place to provide the four-level relief pattern shown in profile 414. At this point, the etching is terminated and then the remaining developed photoresist 408 is removed to provide the desired four-level relief pattern in the surface of substrate 402 shown in profile 416, which four levels consist of 0, a, b and (a+b). The superposition of further two-level patterns follows by repeating the resist masking-etching cycle from profiles 410, 412, 414 and 416. Linear addition of the plurality of superposed two-level patterns is inherent and independent of variations in the photoresist thickness.

If sputter-etching is employed, it may be carried out in a conventional RF sputter etching apparatus, and has the characteristic that the etching predominates in a direction normal to the substrate surface with no undercutting of the photoresist mask as would be the case of chemical etching. The etch depth may be controlled by etching for a given time at constant RF power or, more accurately, by monitoring the etching process either in the apparatus by, for example, optical interference techniques, or by periodically removing the substrate and measuring an accumulated edge depth by conventional relief depth measurements.

If plasma-etching (or dry etching) is employed, etching is accomplished in a quartz reactor. Silicon-containing solids such as glass or quartz, are best etched with FREON-type gases (i.e., a gas mixture such as 96% $CF_4$ and 4% $O_2$). The reaction chamber containing the substrate is pumped down to a pressure of about 10 micrometers and then back filled to a pressure of 1 Torr of the reagent gas. Then a discharge is initiated by exciting the gas inside the chamber through an RF voltage applied to a coil around the chamber. The plasma discharge creates very reactive F-containing species in the gas phase which then attacks the non-masked areas on the substrate. At a power level of 100W, the etch rate of silicon monoxide in a gas mixture as indicated above is about 50 nm./min., whereas there is no noticeable attack on the Shipley AZ 1350 resist.

Further, for the purpose of the present invention, the meaning of the term "photoresist" is not confined to the conventional type of polymer photoresists, such as those manufactured by the Shipley Co., Inc., Newton, Mass. The term "photoresist" is also intended to cover equivalent type structures for an etching mask, such as a photo-lithographic produced two-level pattern in a metal film, for instance, since this is a well known variation in the field of sputter-etching of fine patterns.

Also, in addition to pure materials, the substrate into which the relief pattern is etched may also be a layered structure. For instance, a thin film of approximately 5 micrometers, of a material such as silicon monoxide with excellent sputter-etching properties, on a supporting member such as quartz or glass has been found to give good results. In addition, it is not necessary that the initial substrate surface be flat. It may already possess a relief pattern which may include continuous portions or be composed of any number of discrete levels. The disclosed technique then serves to superimpose one or more two-level relief patterns on the initial surface.

In actual sputter-etching experiments, selected substrates such as (1) quartz and (2) a silicon monoxide film of about 5 micrometers thickness deposited on a quartz plate were spun coated with a 2 micrometer film of Shipley AZ 1350 positive photoresist and dried by baking for 30 minutes at a temperature of 80° C. The photoresist was exposed in a grating pattern of a line spacing period of 5 micrometers by contact printing through a chrome-on-glass mask with ultraviolet light from a 500 watt mercury lamp. Typical exposure times were 2-5 minutes. The resist was then developed for 15 to 30 seconds using Shipley AZ 1350 developer at 1:1 dilution to water giving a square profile relief grating in the photoresist. The resist was hardened by baking for 30 minutes in a nitrogen atmosphere on a hot plate at a temperature of about 80° C. At higher baking temperatures it was found that the resist tended to flow leading to degradation of the square wave profile.

The substrate was then placed on the water-cooled substrate table in a conventional RF-diode sputtering apparatus. The system was pumped down to a pressure of $5 \times 10^{-6}$ Torr and argon was then admitted to a pressure of $2 \times 10^{-2}$ Torr. Sputter etching was carried out at an RF power of 50 W, which corresponds to a bombarding voltage of 500 V. The sputter conditions result in an etch rate of about 4 nm./min. of the silicon monoxide. Higher power or bombarding voltages led to an extremely rough resist surface and loss in edge definition. Best results were obtained with the silicon monoxide substrate. Whereas the etch rate for quartz was typically about ⅔ than of the photoresist, the etch rates of silicon monoxide and the resist were comparable. Typical etch depths were about 1.1 micrometers.

After etching the remaining photoresist was removed with acetone and the substrate recoated with nominal 2 micrometer film of photoresist. The second grating pattern was contact printed onto the photoresist with an orientation of 90° to the first pattern, developed and baked. The substrate was then sputter etched a second time by a depth of about 1.4 micrometers and the remaining resist was removed using acetone.

Resulting structures were four-level relief patterns similar to that shown in profile 416. An analysis of the grating profiles in silicon monoxide by scanning electron microscopy revealed at the edges were very sharp and the etched surfaces were optically smooth. The sidewalls of the grating lines were typically within 20° of the vertical. Analysis of the optical diffraction properties of the structure confirmed a linear addition of the two etching steps in a satisfactory four-level profile of the structure.

Fabricated multi-level structures were hot embossed in thermoplastic film such as polyvinyl chloride and polycarbonate both directly and via an intermediate metal master. Final structures were thus formed in transparent media as required for applications in optics, such as diffractive subtractive color filters.

While positive photoresists, such as Shipley AZ 1350 are to be preferred because they provide best definition for fine gratings (d less than 10 micrometers), negative photoresists can also be used.

What is claimed is:

1. A color diffractive subtractive filter master recording for use in forming a stamper that simultaneously embosses preselected ones of all combination of three subtractive primary colors on a single surface of a transparent sheet of plastic in the fabrication of color diffractive subtractive filters, said master recording including:

a substrate having a diffractive structure comprised of three angularly-displaced diffraction-grating two-level relief patterns on the surface of said substrate, said substrate surface including at least first and second regions, said three two-level relief patterns being arranged so that within said first region all three of said two-level relief patterns are superposed to provide a relief pattern having eight different levels and within said second region at least one but less than all three of said relief patterns are disposed to provide a relief pattern having at least two and no more than four different levels, wherein a first of said three two-level relief patterns has a first given depth corresponding substantially to a null for a first of said three primary colors of zero-order diffraction light, wherein a second of said three two-level relief patterns has a second given depth corresponding substantially to a null for a second of said three primary colors of zero-order diffraction, and wherein a third of said three two-level relief patterns has a third given depth corresponding substantially to a null for a third of said three primary colors of zero-order diffractive light.

2. The master recording defined in claim 1, wherein said diffractive structure comprises the resultant of the sequential build up, with additional material, of said first, second and third of said three two-level relief patterns, in that order, on an initially smooth surface of said substrate.

3. The master recording defined in claim 2, wherein said additional material is evaporated material that has condensed on said substrate.

4. The master recording defined in claim 1, wherein said diffractive structure comprises the resultant of the sequential subtractive removal of substrate material of said first, second and third of said three two-level relief patterns, in that order, from an initially smooth surface of said substrate.

* * * * *